C. W. CHENEY.
AUTOMATIC TOY.
APPLICATION FILED DEC. 4, 1908.
936,602.
Patented Oct. 12, 1909.
2 SHEETS—SHEET 1.
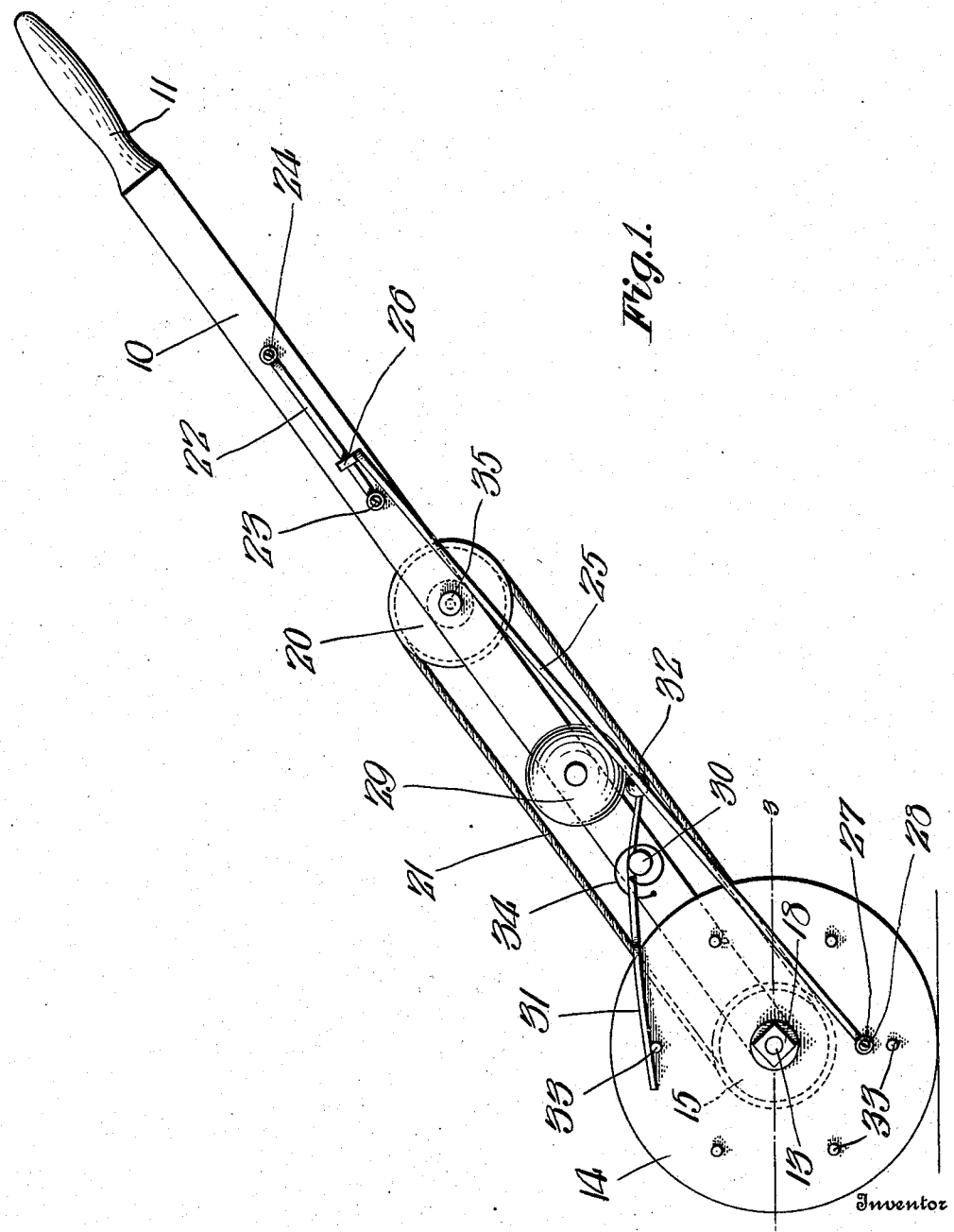
Witnesses
Chas. C. Richardson.
C. N. Woodward
Inventor
Charles W. Cheney,
By
Attorney C. W. CHENEY.
AUTOMATIC TOY.
APPLICATION FILED DEC. 4, 1908.
936,602.
Patented Oct. 12, 1909.
2 SHEETS—SHEET 2.
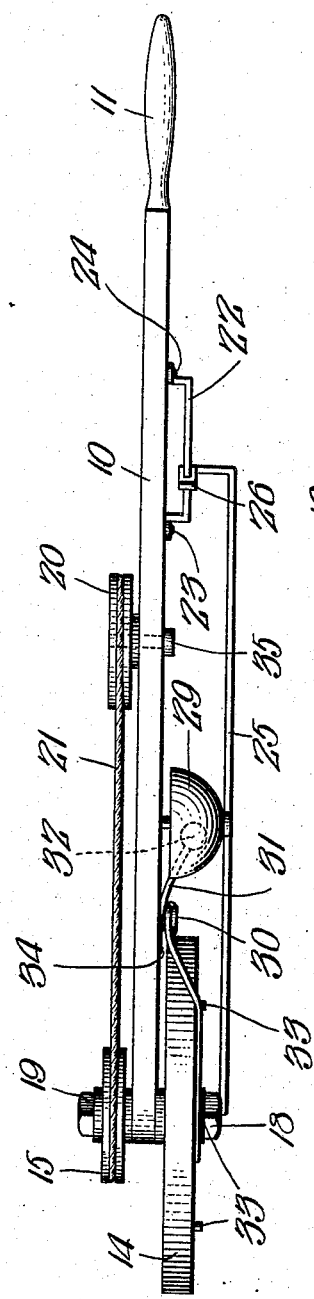
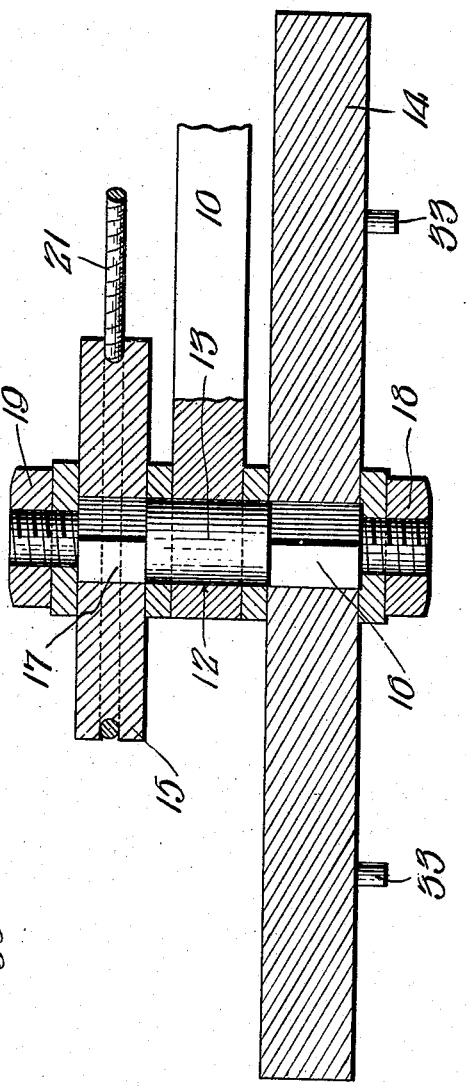
Witnesses
Chas. C. Richardson,
C. N. Woodward
Inventor
Charles W. Cheney,
By Chandler & Chandler
Attorneys

UNITED STATES PATENT OFFICE.

CHARLES W. CHENEY, OF ATLANTA, GEORGIA.

AUTOMATIC TOY.

936,602.  Specification of Letters Patent.  Patented Oct. 12, 1909.

Application filed December 4, 1908. Serial No. 465,982.

*To all whom it may concern:*

Be it known that I, CHARLES W. CHENEY, a citizen of the United States, residing at Atlanta, in the county of Fulton, State of Georgia, have invented certain new and useful Improvements in Automatic Toys; and I do hereby declare the following to be a full, clear, and exact description of the invention, such as will enable others skilled in the art to which it appertains to make and use the same.

This invention relates to automatic toys, and has for one of its objects to provide a simply constructed device adapted to be moved over the ground to cause certain moving parts to be operated through the action of a ground wheel, and instruct and amuse the child.

Another object of the invention is to provide a device of this character whereby moving parts are operated and a bell sounded from the motion imparted by a ground wheel.

With these and other objects in view the invention consists in certain novel features of construction as hereafter shown and described and then specifically pointed out in the claims, and in the drawings illustrative of the preferred embodiment of the invention, Figure 1 is a side elevation of the improved device. Fig. 2 is a plan view of the same. Fig. 3 is an enlarged, detail in section on the line 3—3 of Fig. 1, illustrating the construction of the operating mechanism of the improved device.

The improved device comprises a stock or handle 10 having a handle 11 at one end and a transverse aperture 12 at the other end. Mounted for rotation through the aperture 12 is a shaft 13 having a ground wheel 14 rigidly connected to the shaft at one end and at one side of the stock 10 and a cord pulley 15 rigidly connected to the shaft at the opposite side of the stock. The shaft 13 is preferably provided with a square portion 16 near one end upon which a square aperture in the ground wheel 14 bears, and with a square portion 17 near the other end upon which a square aperture in the cord pulley 15 fits, the ground wheel and cord pulley being secured in position respectively by nuts 18—19. By this means the shaft is free to rotate in the aperture 12 while the wheels 14—15 are rigidly connected thereto and partake of the motion of the shaft.

Secured in the stock 10 intermediate the ground wheel 14 and the handle 11 is a stub shaft or stud 35 carrying a cord pulley 20, the two cord pulleys 15—20 being in alinement longitudinally of the stock so that an endless cord 21 operatively engages over the pulleys, as shown. By this means as the wheel 14 is moved over the ground, the motion of the ground wheel is imparted to the shaft 13 and thence to the cord pulley 15 and the cord pulley 20, as will be obvious.

Secured to the stock 10 at the same side thereof as the ground wheel is secured is a guide device formed from a single piece of wire 22 directed inwardly at the ends and formed into eyes to receive screws or other fastening devices 23—24, the body of the guide member being thus spaced away from the stock 10. Extending between the guide member 22 and the ground wheel 14 is a rod 25 having an eye 26 at one end and slidably engaging the guide member 22, and with an eye 27 at the other end engaging over a crank pin 28 extending from the ground wheel 14.

Attached to the stock 10 between the guide member 22 and the ground wheel 14 is a bell 29, and pivoted at 30 to the stock 10 is an arm 31 having a hammer 32 at one end and with the other end extending over the outer face of the wheel 14, the latter provided with a plurality of trip pins 33, adapted to successively engage the arm 31 and cause the hammer 32 to intermittently strike the bell. The arm 31 is provided with a spring 34 arranged to maintain the arm yieldably in position, and return it to its normal position when released successively from the pins 33. By this arrangement it will be obvious that as the device is moved over the ground, the rod 25 will be reciprocated upon the guide member 22, the wheels 15—20 rotated, and the bell sounded intermittently and as many times during each revolution of the ground wheel as there are pins thereon.

The improved device is simple in construction, can be inexpensively manufactured, and will impart amusement and instruction to the child using it, and will have the appearance of a miniature engine or motor, the action of the rod 25 giving the impression to the operator that the rod is imparting the motion to the wheel.

The stock 10 and wheels 14—15—16 will preferably be of wood, while the remaining parts except the cord 21 will be of metal.

What is claimed, is:

1. A toy of the character described comprising a stock having a handle at one end, a shaft extending through the stock at the end opposite to the handle, a ground wheel connected to said shaft at one side of the stock and provided with a crank pin, a cord pulley connected to the shaft at the opposite side of the stock from the ground wheel, a cord pulley mounted for rotation upon said stock and spaced from said first mentioned cord pulley, an endless cord extending over said cord pulleys, a guide device connected to said stock, and a rod slidably engaging said guide device at one end and coupled at the other end to said crank pin.

2. A toy of the character described comprising a stock having a handle at one end, a shaft extending through the stock at the end opposite to the handle, a ground wheel connected to said shaft at one side of the stock and provided with a crank pin and a plurality of spaced trip pins, a cord pulley connected to the shaft at the opposite side of the stock from the ground wheel, a cord pulley mounted for rotation upon said stock and spaced from said first mentioned cord pulley, an endless cord extending over said cord pulleys, a guide device connected to said stock, a rod slidably engaging said guide device at one end and coupled at the other end to said crank pin, a bell connected to said stock, and a hammer swinging from said stock and extending at one end into the path of said trip pins.

In testimony whereof, I affix my signature, in presence of two witnesses.

CHARLES W. CHENEY.

Witnesses:
J. E. HERNDON,
M. H. BONE.